United States Patent
Lamour et al.

(10) Patent No.: US 11,256,545 B2
(45) Date of Patent: Feb. 22, 2022

(54) SYSTEM ON CHIP COMPRISING A PLURALITY OF MASTER RESOURCES

(71) Applicant: THALES, Courbevoie (FR)

(72) Inventors: Pierrick Lamour, Merignac (FR); Alexandre Fine, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/838,808

(22) Filed: Apr. 2, 2020

(65) Prior Publication Data

US 2020/0319926 A1 Oct. 8, 2020

(30) Foreign Application Priority Data

Apr. 3, 2019 (FR) ..................................... 19 03553

(51) Int. Cl.
| | | |
|---|---|---|
| *G06F 9/50* | (2006.01) | |
| *G06F 13/12* | (2006.01) | |
| *G06F 13/16* | (2006.01) | |
| *G06F 13/362* | (2006.01) | |
| *G06F 13/40* | (2006.01) | |

(52) U.S. Cl.
CPC .......... *G06F 9/5011* (2013.01); *G06F 13/124* (2013.01); *G06F 13/1673* (2013.01); *G06F 13/362* (2013.01); *G06F 13/4022* (2013.01)

(58) Field of Classification Search
CPC .................................................. G06F 9/5011
See application file for complete search history.

(56) References Cited

U.S. PATENT DOCUMENTS

| | | | | |
|---|---|---|---|---|
| 5,592,485 A | * | 1/1997 | Consiglieri | ......... B60R 16/0315 340/2.1 |
| 5,822,512 A | * | 10/1998 | Goodrum | ............... G06F 11/142 714/13 |
| 5,852,718 A | * | 12/1998 | Van Loo | ............. G06F 13/4022 709/208 |
| 6,009,275 A | * | 12/1999 | DeKoning | ............ G06F 9/5011 710/113 |
| 6,420,935 B1 | * | 7/2002 | Harris | ................... H01P 1/2138 330/295 |
| 2004/0081079 A1 | * | 4/2004 | Forest | ................... H03M 13/43 370/216 |

(Continued)

OTHER PUBLICATIONS

French Search Report issued by the French Patent Office in corresponding French Application No. FR 1903553, dated Jan. 31, 2020.

*Primary Examiner* — Henry Tsai
*Assistant Examiner* — Aurangzeb Hassan
(74) *Attorney, Agent, or Firm* — Arent Fox LLP

(57) ABSTRACT

This system on chip comprises a plurality of master resources, a plurality of slave resources, a plurality of arbitration levels, each arbitration level being able to control the access of at least one master resource to at least one slave resource, each master resource being able to send requests to at least one slave resource according to a bandwidth associated with this slave resource and this master resource.
The system is characterized by further comprising control means configured to control each bandwidth associated with each slave resource as a function of the capacity of this slave resource to process the requests originating from the master resource corresponding to this bandwidth.

10 Claims, 2 Drawing Sheets

(56) References Cited

U.S. PATENT DOCUMENTS

| | | | |
|---|---|---|---|
| 2006/0161704 A1* | 7/2006 | Nystad | G06F 9/54 710/105 |
| 2007/0204082 A1* | 8/2007 | Shimizu | H04L 12/403 710/110 |
| 2009/0037635 A1* | 2/2009 | Chou | G06F 13/36 710/309 |
| 2012/0042105 A1 | 2/2012 | Maeda et al. | |
| 2012/0198266 A1* | 8/2012 | Hofmann | G06F 1/3209 713/501 |
| 2013/0036246 A1* | 2/2013 | Lunadier | G06F 13/1605 710/110 |
| 2013/0191572 A1 | 7/2013 | Nooney et al. | |
| 2014/0121901 A1* | 5/2014 | Shii | G06F 1/266 701/36 |
| 2014/0281079 A1* | 9/2014 | Biskup | G06F 11/1423 710/110 |
| 2015/0161065 A1* | 6/2015 | Lunadier | G06F 13/1642 710/110 |
| 2016/0124890 A1* | 5/2016 | Thompson | G06F 13/4252 710/113 |
| 2017/0244477 A1* | 8/2017 | Seo | H04L 12/40 |
| 2018/0060269 A1* | 3/2018 | Kessler | G06F 13/4022 |
| 2018/0154136 A1* | 6/2018 | Talbot | A61N 1/0543 |
| 2018/0212822 A1* | 7/2018 | Ikeda | H04L 41/082 |
| 2018/0366008 A1* | 12/2018 | Dacre-Wright | G08G 5/0034 |
| 2019/0266091 A1* | 8/2019 | Robinson | G06F 12/10 |
| 2020/0293233 A1* | 9/2020 | Waugh | G06F 12/0811 |

* cited by examiner

SYSTEM ON CHIP COMPRISING A PLURALITY OF MASTER RESOURCES

CROSS-REFERENCE TO RELATED APPLICATIONS

This application claims priority to French Patent Application No. 19 03553, filed on Apr. 3, 2019. The disclosure of the priority application is incorporated in its entirety herein by reference.

FIELD OF THE INVENTION

The present invention relates to a system on chip comprising a plurality of master resources.

As its name suggests, a system on chip comes in the form of a complete system embedded on a single chip. Such a system is also known by the term "System on Chip" or by the abbreviation "SoC".

BACKGROUND OF THE INVENTION

In a manner known per se, such a system on chip comprises one or more master resources and one or more slave resources which may be used by these master resources via a plurality of arbitration levels.

A master resource corresponds, in particular, to a computing core or a processor. In the case of a plurality of master resources, all of these resources are sometimes called multi-masters. A slave resource corresponds, in particular, to a peripheral usable by one or each master resource.

In technical fields where operational reliability has to be high, such as the automotive, aeronautical or nuclear fields, the notion of determinism during the exchange of digital data plays an important role.

This notion makes it possible, in particular, to determine for each digital data a maximum propagation time and, therefore, to guarantee that such data will be delivered from one resource to another within in a limited time characterized by the maximum propagation time.

In the case of using platforms based on multi-master resources, slowdown problems (contentions) appear, especially when accessing slow devices. This may result in lengthy execution times of uncontrolled processes and, therefore, in a loss of determinism.

In fact, in the context of multi-masters, each device has specificities such as, for example, the number of arbitration levels to access it, the speed of the buses and the media, the type of protocol, etc. Some architectures also favor symmetrical and shared access for all master resources to peripherals.

Therefore, when a master resource wishes to access a peripheral, it must pass through a set of internal buses comprising a plurality of arbitration levels.

Since these buses are cascaded from the fastest to the slowest, it is possible to saturate access to a peripheral in the event that the corresponding master resource has a faster bus. In addition, each device being connected via a bus to common arbitration levels, if a device is saturated by the cascade effect, it saturates all of the higher arbitration levels between this device and the master resource requesting access to it.

By saturating one or more arbitration levels, access of the other master resources to the peripherals common to the impacted arbitration levels is slowed down to the speed of the slowest peripheral requested in the whole chain of peripherals.

According to prior art methods, saturation problems in the multi-master context may be resolved upstream by taking into account a percentage of contention to be added to the duration of execution of a process measured in mono-master.

However, this solution is not viable because it would require characterizing the system precisely and exhaustively for the entire field of use. As completeness is difficult to prove, the percentage of contention added is thereby increased, thus reducing the time allocated to applications and therefore affecting the overall performance of the system on chip.

SUMMARY OF THE INVENTION

The object of the present invention is to propose a system on chip making it possible to effectively solve the saturation problems in the multi-master context without substantially degrading the performance of the system.

To this end, the invention relates to a system on chip comprising a plurality of master resources; a plurality of slave resources; a plurality of arbitration levels, wherein each arbitration level is able to control the access of at least one master resource to at least one slave resource.

Each master resource is able to send requests to at least one slave resource according to a bandwidth associated with this slave resource and this master resource, wherein each request transmits digital data or interrogates the corresponding slave resource, and is transmitted via at least one arbitration level.

The system further comprises control means configured to control each bandwidth associated with each slave resource as a function of the capacity of this slave resource to process requests from the master resource corresponding to this bandwidth.

According to other advantageous aspects of the invention, the system comprises one or more of the following characteristics, taken in isolation or in any technically feasible combination:

- each slave resource comprises a buffer memory capable of storing requests to be processed by this slave resource, and defining a total capacity for processing requests;
- each slave resource is able to allocate for each master resource a capacity for processing requests originating from this master resource as a function of its total capacity for processing requests;
- the processing capacity allocated to each master resource by a slave resource is obtained by dividing the total processing capacity of requests by this slave resource by the number of master resources likely to use this slave resource;
- each slave resource is able to send to the control means a full signal when the processing capacity allocated to a master resource is full;
- upon receipt of a full signal, the control means are capable of inhibiting the emission of new requests by the master resource corresponding to this full signal;
- the control means are capable of defining for each master resource a maximum rate of emission of the requests intended for each slave resource;
- the system furthermore comprises means of synchronization capable of detecting the output of each request originating from a master resource and intended for a slave resource, through all of the corresponding arbitration levels;
- the control means are capable of authorizing the emission of a new request by a master resource only when the synchronization means detect the output of a previous request originating from this master resource, through all the corresponding arbitration levels;

each master resource is chosen from a group comprising:
   a computing core;
   a graphics processor;
   a direct memory access unit;
the slave resource is a peripheral.

BRIEF DESCRIPTION OF THE DRAWINGS

These characteristics and advantages of the invention will become apparent upon reading the description which follows, given solely by way of non-limiting example, and made with reference to the appended drawings, in which.

DETAILED DESCRIPTION OF THE INVENTION

Figure 1:
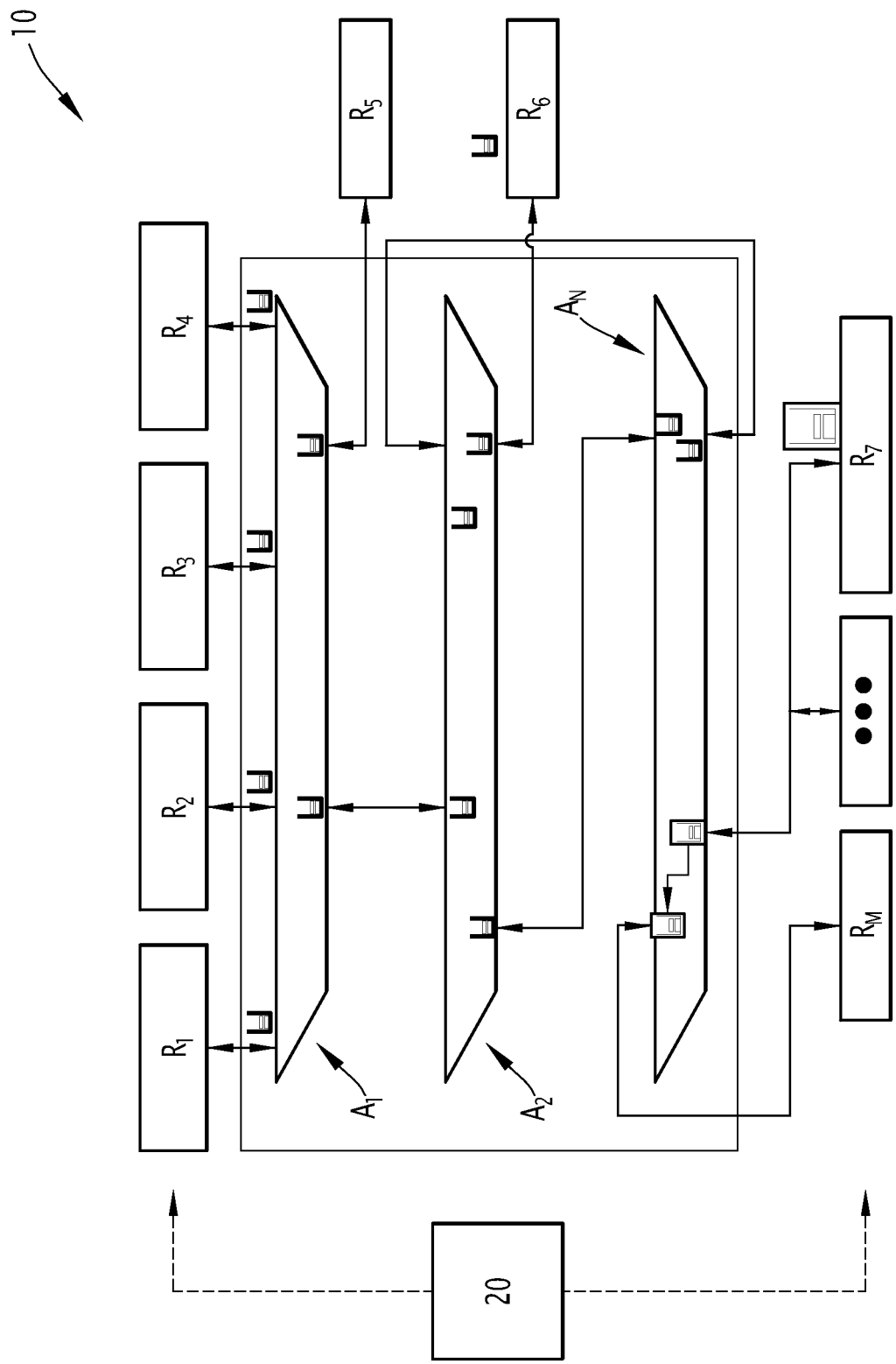
FIG. 1 is a schematic view of a system on chip according to a first mode and a second embodiment of the invention.

FIG. 1 shows a system on chip 10 according to a first and a second embodiment of the invention.

This system 10 comprises M resources $R_1, \ldots, R_M$ and N arbitration levels $A_1, \ldots, A_N$, the numbers M and N being strictly greater than 1.

At least two of the resources $R_1, \ldots, R_M$, called master resources, are capable of interrogating at least two other resources $R_1, \ldots, R_M$, then called slave resources, by sending them requests. The slave resources are therefore able to process the requests received from the corresponding master resources.

The sending of requests is carried out according to a bandwidth associated with the slave resource receiving this request and the master resource sending this request.

A resource $R_1, \ldots, R_M$ may simultaneously present both a master resource for certain resources $R_1, \ldots, R_M$ or a slave resource for certain other resources $R_1, \ldots, R_M$, as will be explained in detail below.

Thus, for example, a resource $R_1, \ldots, R_M$ corresponding to a computing core or to a graphics processor is always considered to be a master resource.

On the other hand, a resource $R_1, \ldots, R_M$ corresponding to a peripheral or to a Direct Memory Access (DMA) unit may present a master resource for at least some of the resources $R_1, \ldots, R_M$ and a slave resource for certain other resources $R_1, \ldots, R_M$.

Each resource $R_1, \ldots, R_M$ is identified within the system on chip 10 by a unique identifier.

Furthermore, each resource $R_1, \ldots, R_M$ includes a buffer memory capable of storing requests to be processed and/or requests to be sent.

This buffer memory defines a total capacity for processing requests by the corresponding resource and is implemented based on the First In First Out (FIFO) principle.

All of the arbitration levels $A_1, \ldots, A_N$ form a component referred to as "InterConnect" in the prior art.

In particular, each arbitration level $A_1, \ldots, A_N$ may be, for example, in the form of one or more access buses making it possible to control the access rights of a master resource to a slave resource.

In other words, the transmission of requests from a master resource to a slave resource is always carried out via n arbitration levels where the number n is greater than or equal to 1 and less than or equal to N.

In addition, the arbitration levels $A_1, \ldots, A_N$ are distributed hierarchically between them.

Just like the resources $R_1, \ldots, R_M$, each arbitration level $A_1, \ldots, A_N$ comprises a buffer memory per link capable of storing requests to be transmitted to the higher arbitration level and/or to the lower arbitration level and/or associated slave resources.

Each resource $R_1, \ldots, R_M$ is associated with one of the arbitration levels $A_1, \ldots, A_N$ and is able to receive requests transmitted by this arbitration level and/or to send requests to this arbitration level.

In particular, each arbitration level $A_1, \ldots, A_N$ is able to transmit a request to a resource $R_1, \ldots, R_M$ associated with this arbitration level $A_1, \ldots, A_N$ when this request comes from a resource $R_1, \ldots, R_M$ associated with this same arbitration level $A_1, \ldots, A_N$ or with a higher arbitration level $A_1, \ldots, A_N$.

Thus, the arbitration levels $A_1, \ldots, A_N$ define the hierarchy between the resources $R_1, \ldots, R_M$ and in particular, the capacity of each resource $R_1, \ldots, R_M$ to be a master resource or a slave resource with respect to each other resource $R_1, \ldots, R_M$ of the system 10.

In the example of FIG. 1, the resources $R_1$ to $R_4$ are associated with the arbitration level $A_1$ and have computing cores. These resources are therefore always master resources.

The resource $R_5$ also associated with the arbitration level $A_1$ has a cache memory for example of level 2. It is therefore capable of processing requests originating from resources $R_1$ to $R_4$ and is considered by these resources $R_1$ to $R_4$ to be a slave resource.

Similarly, the resource $R_M$ associated with the arbitration level $A_N$ and having a DMA unit, is considered to be a master resource by the resource $R_7$ associated with the same arbitration level $A_N$ and presenting a peripheral.

Throughout the text, when a master resource is mentioned, it is understood that this resource is considered to be a master resource by at least one other resource. Similarly, when mention is made of a slave resource, it is understood that this resource is considered to be a slave resource by at least one other resource.

According to the invention, the system 10 further comprises control means 20 configured to control each bandwidth associated with each slave resource as a function of the capacity of this slave resource to process requests from the master resource corresponding to this bandwidth.

In other words, the control means 20 make it possible to control the bandwidth to each slave resource from each master resource.

To do this, these control means 20 are in the form of a controller integrated into the system on chip 10, connected to each master resource and configured to control the transmission of requests by each master resource using one of the techniques described below. Such a controller can be formed by a software or, for example, by programmable circuits.

In particular, according to the first embodiment of the invention, each slave resource is configured to allocate for each master resource a capacity for processing requests originating from this master resource as a function of its total capacity for processing requests.

This allocation is, for example, carried out at the design stage of the system 10 and is, for example, frozen during the operation of the system 10. It may be, for example, kept within each slave resource in the form of a table comprising the identifier of each master resource with the processing capacity allocated to this master resource.

The processing capacity allocated to each master resource by a slave resource is obtained, for example, by dividing the total processing capacity of requests by this slave resource, by the number of master resources capable of using this slave resource.

In this case, each slave resource is able to send to the control means 20 a full signal when the processing capacity allocated to a master resource is full.

Upon receipt of a full signal, the control means 20 are able to inhibit the transmission of new requests by the master resource corresponding to this full signal.

In other words, according to the first embodiment, the control means 20 inhibit the transmission of each new request by a master resource to a slave resource when the processing capacity allocated by the slave resource to this master resource is full.

When this processing capacity is restored to normal, the slave resource is able, for example, to send a corresponding signal to the control means 20 which lift the ban on the transmission of requests by the corresponding master resource.

According to a second embodiment, the control means 20 are able to define for each master resource, a maximum rate of transmission of the requests intended for each slave resource.

These maximum transmission rates are defined, for example, at the design stage of the system 10 as a function of the bandwidths of the various arbitration levels and of the master resources, of the processing capacities by the slave resources, as well as of the number of these elements.

Thus, the maximum emission rates for each master resource with regard to each slave resource are, for example, kept in the form of a table by the control means 20 and are, for example, frozen during the operation of the system 10.

According to this embodiment, the control means 20 inhibit the transmission of requests by a master resource to a slave resource when the rate of their transmission exceeds the maximum rate of transmission defined for this master resource and this slave resource.

Figure 2:
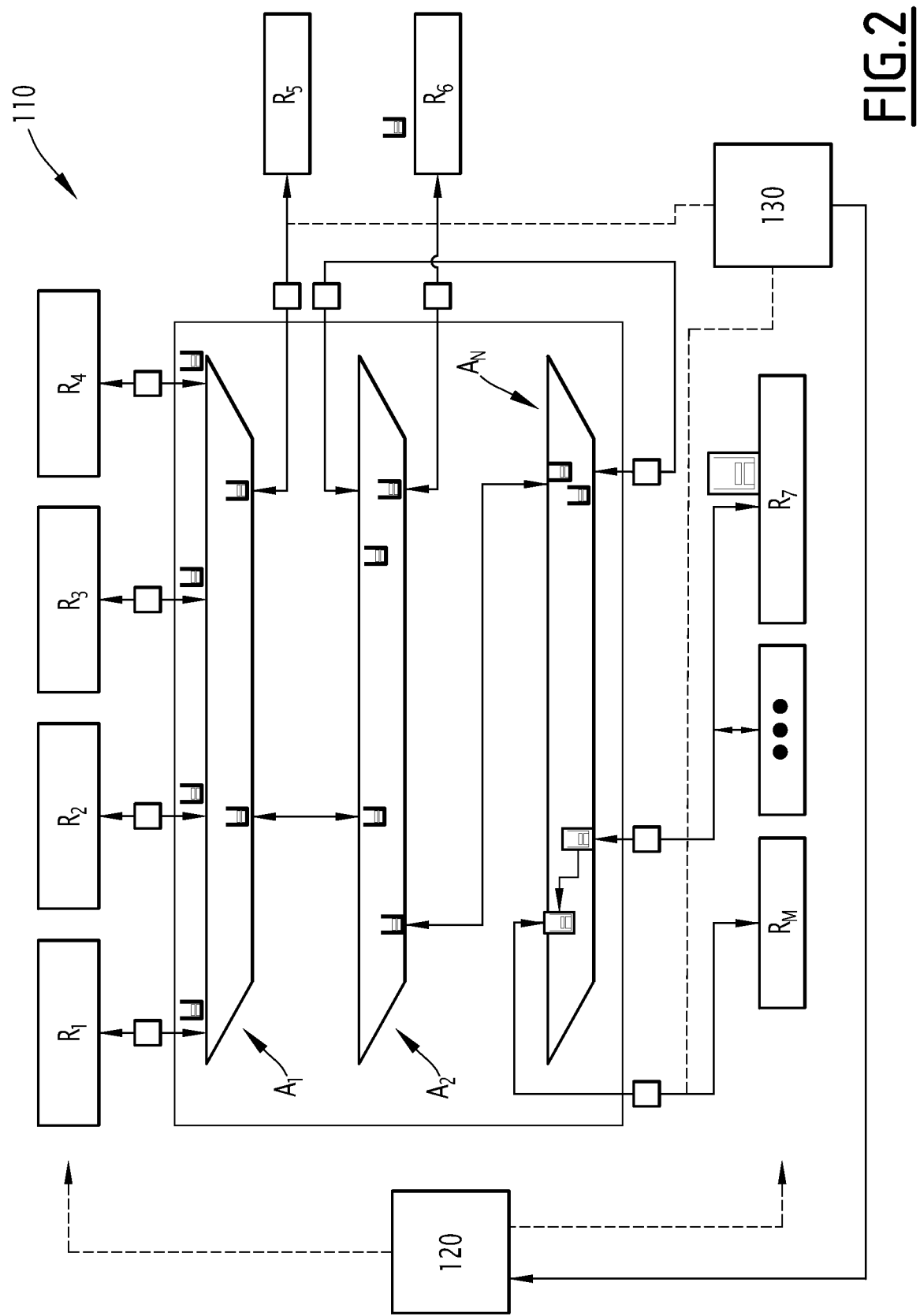
FIG. 2 is a schematic view of a system on chip according to a third embodiment of the invention.

FIG. 2 shows a system on chip 110 according to a third embodiment.

This system 110 is analogous to the system 10 described with reference to FIG. 1 and comprises, as in the previous case, M resources $R_1, \ldots, R_M$ and N arbitration levels $A_1, \ldots, A_N$ analogous to those described above.

This system 110 also comprises control means 120 configured to control each bandwidth associated with each slave resource as a function of the capacity of this slave resource to process the requests originating from the master resource corresponding to this bandwidth.

The system 110 according to the third embodiment further comprises synchronization means 130, called also synchronizer. Such a synchronizer can be formed by a software or physical programmable circuits.

These synchronization means 130 are able to detect the output of all the arbitration levels $A_1, \ldots, A_N$ corresponding to each request from a master resource and intended for a slave resource.

To do this, the synchronization means 130 define, for example, an input observer at each input of each of the arbitration levels $A_1, \ldots, A_N$ and an output observer at each output of each of the arbitration levels $A_1, \ldots, A_N$.

When an output observer detects a request detected beforehand by an input observer, the synchronization means 130 conclude that the corresponding request has left all the arbitration levels $A_1, \ldots, A_N$ and is therefore consumed by the destination slave resource.

In this case, the control means 120 are able to authorize the transmission of a new request by a master resource to a slave resource only when the synchronization means 130 detect the output of all the arbitration levels $A_1, \ldots, A_N$ corresponding to a previous request from this master resource and intended for this slave resource.

It should therefore be understood that the present invention offers a number of advantages.

In particular, the control of the transmission of requests by each master resource to a slave resource according to the first embodiment of the invention makes it possible to avoid saturation at the input of this slave resource. This thus decreases the probability of saturation of the arbitration levels leading to this slave resource.

In the second embodiment, the probability of saturation of the arbitration levels is reduced because the maximum rates defined for each master resource take into account the bandwidths of each of the elements used to transmit the requests as well as the processing capacities of these requests by slave resources.

Finally, in the third embodiment, the saturation of the arbitration levels is practically excluded by synchronizing the inputs and outputs of the requests.

Thus, each of these embodiments makes it possible to solve the problems linked to the temporal non-determinism of execution of systems on chip in the multi-master context.

Of course, it is also possible to provide other embodiments.

In particular, some of these embodiments may correspond to combinations of the embodiments described above.

The invention claimed is:

1. A system on chip comprising:
   a plurality of master resources for aeronautical applications;
   a plurality of slave resources for aeronautical applications;
   a plurality of arbitration levels, each arbitration level being able to control access of at least one master resource to at least one slave resource;
   wherein each master resource is configured to send requests to at least one slave resource of the plurality of slave resources according to a bandwidth associated with a slave resource and a master resource, each request transmitting digital data or interrogating the slave resource, and being transmitted via at least one arbitration level; and
   a controller configured to control each bandwidth associated with each slave resource based on a processing capacity of the slave resource allocated to process requests received from the master resource, and to control the request of each master resource to the corresponding slave resource based on the bandwidth control;
   wherein the controller forms a separated unit from each master resource and each slave resource.

2. The system according to claim 1, wherein each slave resource comprises a buffer memory capable of storing requests to be processed by this slave resource and defining a total capacity for processing requests;
   each slave resource being able to allocate for each master resource a capacity for processing requests from this master resource as a function of its total capacity for processing requests.

3. The system according to claim 2, wherein the processing capacity allocated to each master resource by a slave resource is obtained by dividing the total capacity for processing requests by this slave resource, by a number of master resources capable to use this slave resource.

4. The system according to claim 2, wherein each slave resource is able to send to the controller a full signal when the processing capacity allocated to a master resource is full.

5. The system according to claim 4, wherein, upon reception of a full signal, the controller is capable of inhibiting an emission of new requests by the master resource corresponding to this full signal.

6. The system according to claim 1, wherein the controller is capable of defining for each master resource a maximum rate of emission of the requests intended for each slave resource.

7. The system according to claim 1, further comprising a synchronizer capable of detecting an output of each request from a master resource and intended for a slave resource, through all of the corresponding arbitration levels.

8. The system according to claim 7, wherein the controller is able to authorize an emission of a new request by a master resource only when the synchronizer detects the output of a previous request from this master resource, through all of the corresponding arbitration levels.

9. The system according to claim 1, wherein each master resource is chosen from a group comprising:
   a computing core;
   a graphics processor;
   a direct memory access unit.

10. The system according to claim 1, wherein the slave resource is a peripheral.

* * * * *